United States Patent
Loo

(10) Patent No.: US 8,495,030 B2
(45) Date of Patent: *Jul. 23, 2013

(54) RECORDS DECLARATION FILESYSTEM MONITORING

(75) Inventor: Dennis Loo, Rowland Heights, CA (US)

(73) Assignee: International Business Machines Corporation, Armonk, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 12/986,061

(22) Filed: Jan. 6, 2011

(65) Prior Publication Data

US 2012/0179648 A1    Jul. 12, 2012

(51) Int. Cl.
*G06F 17/00* (2006.01)
*G06F 17/30* (2006.01)
*G06F 15/16* (2006.01)

(52) U.S. Cl.
CPC .......... *G06F 17/00* (2013.01); *G06F 15/16* (2013.01)
USPC ........... 707/690; 707/648; 707/694; 707/821; 707/827; 709/203; 709/206; 709/225; 726/1

(58) Field of Classification Search
CPC ............ G06F 17/00; G06F 17/30; G06F 15/16
USPC ......... 707/609–611, 672, 705, 758, 781–785, 707/821–831, 648–649, 690, 694, 736, 791; 726/1, 26; 709/203, 206, 225
See application file for complete search history.

(56) References Cited

U.S. PATENT DOCUMENTS

| | | | |
|---|---|---|---|
| 5,737,523 A * | 4/1998 | Callaghan et al. | 726/21 |
| 5,764,972 A * | 6/1998 | Crouse et al. | 1/1 |
| 5,892,917 A * | 4/1999 | Myerson | 709/224 |
| 6,928,442 B2 * | 8/2005 | Farber et al. | 1/1 |
| 6,996,553 B2 * | 2/2006 | Agrawal et al. | 707/694 |
| 7,031,981 B1 * | 4/2006 | DeLuca et al. | 1/1 |
| 7,844,582 B1 * | 11/2010 | Arbilla et al. | 707/694 |
| 7,991,747 B1 * | 8/2011 | Upadhyay et al. | 707/674 |
| 8,234,317 B1 * | 7/2012 | Pogde | 707/821 |
| 2003/0078975 A1 * | 4/2003 | Ouchi | 709/205 |
| 2004/0111641 A1 * | 6/2004 | Oshima et al. | 713/201 |
| 2007/0022138 A1 * | 1/2007 | Erasani et al. | 707/104.1 |

(Continued)

FOREIGN PATENT DOCUMENTS

WO    WO 92/18931    * 10/1992
WO    WO 2004/010304    * 1/2004

OTHER PUBLICATIONS

Jesus Molina et al. "An Empirical Study of Filesystem Activity Following a SSH Compromise", IEEE 2007, pp. 1-5.*

(Continued)

*Primary Examiner* — Srirama Channavajjala
(74) *Attorney, Agent, or Firm* — Patterson & Sheridan, LLP

(57) ABSTRACT

Techniques for managing records on a filesystem to enforce a record disposition protocol. Embodiments identify records on the filesystem using one or more record definitions. Each record definition may contain a conditional statement which, if satisfied by a particular file on the filesystem, indicates the particular file as a record. Embodiments may then monitor file activity for each of the identified records and upon detecting the file activity, may enforce the record disposition protocol for the record. Such enforcement may include preventing the file activity, and may further include logging information related to the file activity.

8 Claims, 6 Drawing Sheets

U.S. PATENT DOCUMENTS

| | | | |
|---|---|---|---|
| 2007/0028063 A1* | 2/2007 | Hars et al. | 711/162 |
| 2007/0088736 A1 | 4/2007 | DeBie | |
| 2007/0094354 A1* | 4/2007 | Soltis | 709/218 |
| 2007/0300222 A1* | 12/2007 | Sincaglia et al. | 718/1 |
| 2008/0168170 A1* | 7/2008 | Nakatani et al. | 709/224 |
| 2008/0243953 A1* | 10/2008 | Wu et al. | 707/204 |
| 2010/0082548 A1 | 4/2010 | Crockett et al. | |
| 2010/0146269 A1* | 6/2010 | Baskaran | 713/165 |
| 2012/0059796 A1 | 3/2012 | Neumann et al. | |
| 2012/0059798 A1* | 3/2012 | Madhavarapu et al. | 707/655 |
| 2012/0284226 A1 | 11/2012 | Loo | |

OTHER PUBLICATIONS

Hongguang Zhang et al. "Design and Implementation of Broadcast File System Based on DSM-CC Data Carousel Protocol", IEEE 2004, pp. 929-933.*

* cited by examiner

RECORDS DECLARATION FILESYSTEM MONITORING

BACKGROUND

The present invention relates to filesystem management, and more particularly to declaring and managing records on a filesystem.

Many businesses and government offices have a need to monitor activities involving documents and other files on their computer systems. One reason for such monitoring is to improve the security of the documents. Monitoring may also be used to ensure compliance with certain laws and regulations by showing access or lack of access by business employees to particular documents and information. The monitoring may include what files are being accessed, what actions are being performed on the files and who is performing the actions. As an example, a business may wish to ensure that a particular contract document is not modified after a particular point in time (e.g., once both parties agree to the terms of the contract). By monitoring and logging activities involving the document, the business may later show that no modifications were made to the terms of the document after the particular point in time. As a second example, a particular document may contain privileged information that, if viewed by certain employees of the business, may result in certain legality issues (e.g., insider trading). Thus, the business may wish to monitor and log all accesses to the document, in order to later show that a particular user did or did not view the contents of the document.

Although businesses and government agencies may have a need to monitor all filesystem activity occurring on their computer systems, one challenge to such monitoring is that such computer systems may not always be connected to the network. That is, while one existing technique for monitoring such records is through the use of a centralized record management server on which all files are kept, such a solution requires users to have an active network connection in order to access the record management server. However, in the modern workplace environment, many employees are travelling and working remotely on a regular basis. Accordingly, such a network connection to the centralized record management server may not always be available. A further limitation of such a solution is that the centralized record management server cannot monitor files created locally on a user's computer, especially when the user is working offline. For instance, if a user accesses a local copy of a document when working offline, the record management server has no way of knowing of the access, much less logging or preventing the access.

SUMMARY

Embodiments of the invention provide a method, system and product for managing records. The method, system and product include declaring one or more files from a plurality of filesystems as an electronic record to be retained. Additionally, the method, system and product include monitoring activity in each of the plurality of filesystems by a respective filesystem monitor of a plurality of filesystem monitors. Furthermore, the method, system and product include, for the monitored activity and by at least one of the filesystem monitors, enforcing a record disposition protocol for the declared electronic records. Here, the record disposition protocol specifies to prevent at least one of access, alteration and deletion of the declared electronic records.

Another embodiment of the invention provides a method for managing records. The method includes retrieving one or more record definitions from a record manager. Each record definition contains a conditional statement for identifying records. The method further includes identifying a first file on a first filesystem as a first record, based on the first file satisfying the conditional statement of at least one of the record definitions. Additionally, the method includes monitoring file activity for the identified first record to enforce a record disposition protocol, wherein the record disposition protocol specifies allowed file activity for the identified first record. Furthermore, the method includes, upon detecting file activity for the identified record, allowing the file activity to complete only if the file activity does not violate the record disposition protocol.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
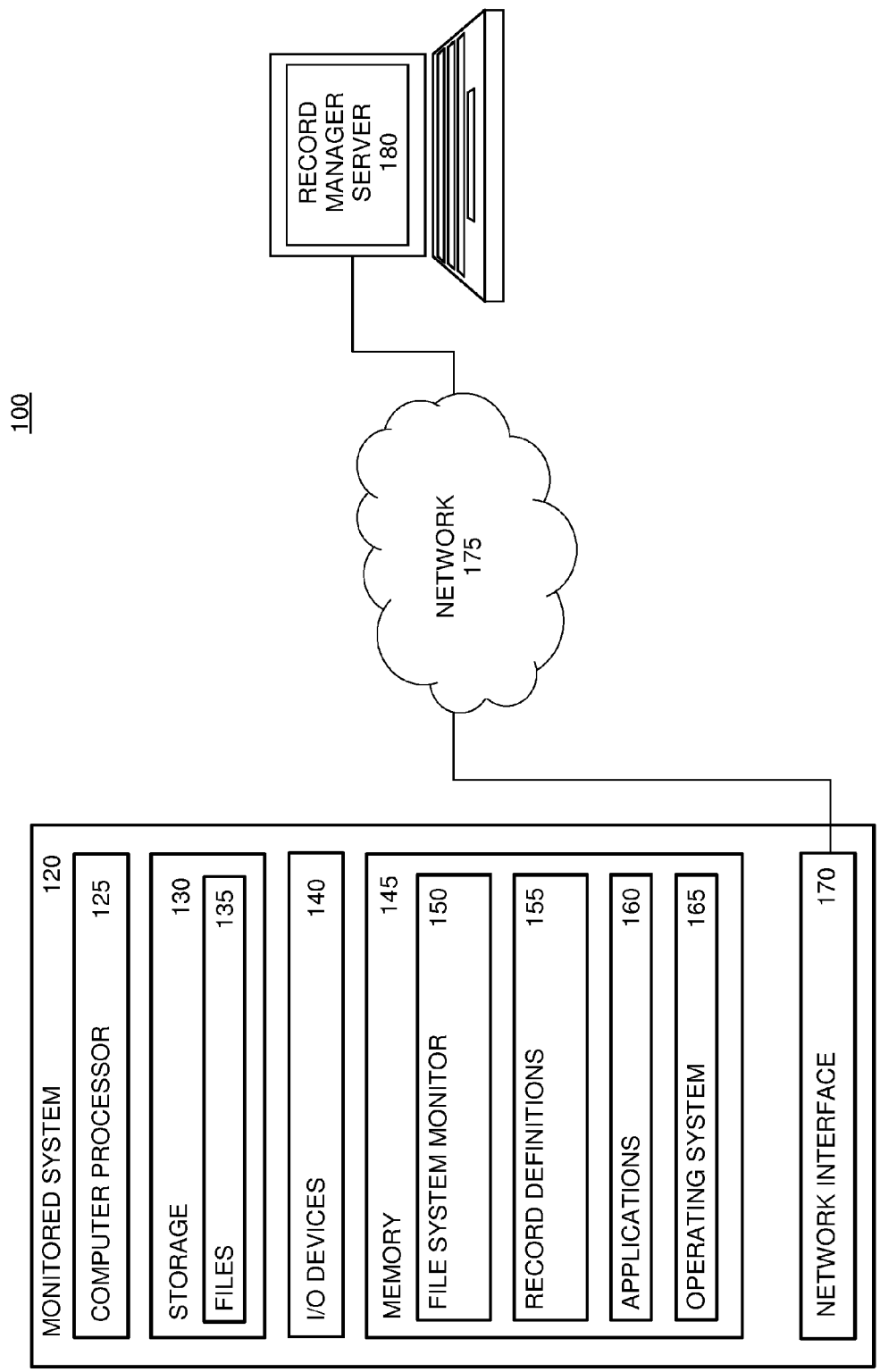
FIG. 1 is a block diagram illustrating a system configured to run a filesystem monitor, according to one embodiment of the present invention.

Embodiments of the invention provide techniques for managing records on a filesystem. Embodiments may retrieve one or more record definitions from a record manager. Each record definition may include a conditional statement which may be used to identify files on the filesystem as records. For instance, in one embodiment, a record definition may contain the expression "*.doc," which would identify all files ending in the .doc file extension as records. The record manager may be a centralized record management server which maintains record definitions and other record information for a group of computer systems. For instance, a particular business may have a single record manager which tracks all the records on all the business's computer systems.

Embodiments may then use the retrieved record definitions to identify one or more files on the filesystem as a record. Such identification may be made based on the files satisfying the conditional statement of at least one of the retrieved record definitions. Continuing the above example, a file with the name "FinancialReport.doc" may be identified as a record, since the file name satisfies the conditional statement of "*.doc" contained in one of the record definitions. In one embodiment, a listing of all the records on the filesystem may be transmitted to the record manager for incorporation into a comprehensive listing of all records. In such an embodiment, in the event that no network connection to the record manager is available (e.g., when the user is working offline), the listing may be maintained locally and transmitted to the record manager once a network connection becomes available.

Upon identifying the records on the filesystem, embodiments may monitor file activity associated with the identified records. Such file activity may include, without limitation, the creation of new files, modifications to existing files, or even accesses to existing files (e.g., a user viewing the contents of a record). Upon detecting file activity for one of the identified records, embodiments may enforce a record disposition protocol. Generally, the record disposition protocol may specify what actions a user is allowed to perform on a record and what actions should be logged. As a first example, embodiments may detect that a particular user is attempting to delete a record on the filesystem. If such an activity is prohibited by the record disposition protocol, embodiments may prevent the deletion operation from occurring. As a second example, the user may attempt to view the contents of the record. If such an activity is allowed under the record disposition protocol, embodiments may allow the user to read the contents of the record, but may create a log entry specifying which record was accessed, who accessed the record and what time the record was accessed. In the event that the user makes modifications to the record, the log entry may further specify what changes the user made to the record. In one embodiment, such a log entry may also be transmitted to the record manager for incorporation into a comprehensive listing of log entries, once a network connection to the record manager is available.

Advantageously, embodiments of the invention provide techniques for managing records on filesystems that are adapted to fit the modern business environment. That is, by keeping local copies of the record definitions, embodiments of the invention may identify records even when no network connection to the record manager is available. As an example, assume that a user is working offline using a laptop and goes to create a new document named "EarningsStatement.doc." For purposes of this example, assume that the aforementioned record definition containing the conditional statement of "*.doc" has been previously retrieved from the record manager. In such an example, embodiments may determine that the newly created "EarnignsStatement.doc" file should be marked as a record, and accordingly that the record disposition protocol should be enforced for this file. Advantageously, by doing this, a business may ensure that their record disposition protocol is enforced at all times. Furthermore, because embodiments may enforce such a protocol even when the user is working offline, such enforcement provides minimal interference with the work activities of the business's employees, and allows the employees to perform their work without requiring a network connection to the record manager server.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a word processor application for viewing or modifying a record) or related data available in the cloud. For example, a filesystem monitor 150 could execute on a computing system in the cloud and could monitor file activities pertaining to records on the computing system. In such a case, upon detecting activity related to one of the records, the filesystem monitor 150 could enforce a record disposition protocol for the record, which may include preventing the file activity. Additionally, enforcement of the record disposition protocol may also include logging information relating to the file activity and storing such a log entry at a storage location in the cloud. Doing so allows the record disposition protocol to be enforced whenever a user accesses the records from any computing system attached to a network connected to the cloud (e.g., the Internet).

Referring now to FIG. 1, FIG. 1 is a block diagram illustrating a system configured to run a filesystem monitor, according to one embodiment of the present invention. As shown, the system 100 includes a monitored system 120 and a record manager server 180, communicatively coupled via a network 175. The monitor system 120 contains a computer processor 125, storage media 130, I/O devices 140, memory 145 and a network interface 170. The computer processor 125 may be any processor capable of performing the functions described herein. The storage media 130 further contains a plurality of files 135. The monitored system 120 may connect to the network 175 using the network interface card 170. Furthermore, as will be understood by one of ordinary skill in the art, any computer system capable of performing the functions described herein may be used.

Illustratively, memory 145 contains a filesystem monitor 150, record definitions 155, software applications 160 and an operating system 165. Although memory 145 is shown as a single entity, memory 145 may include one or more memory devices having blocks of memory associated with physical addresses, such as random access memory (RAM), read only memory (ROM), flash memory or other types of volatile and/or non-volatile memory. In one embodiment, the record definitions 155 may be periodically updated from the record manager sever 180 (e.g., using the network 175). The operating system 165 may be any operating system capable of performing the functions described herein.

The filesystem monitor 150 may generally identify records from the files 135 contained on storage 130. The filesystem monitor 150 may use the record definitions 155 for use in identifying which files should be classified as records, and accordingly, which files the record disposition protocol should be enforced for. As discussed above, each record definition 155 may contain a conditional expression which, if satisfied by a particular file 135, identifies the file 135 as a record. As an example, a record definition 155 may contain the conditional expression of "*.txt," which identifies any file matching the conditional expression as a record for which the disposition protocol should be enforced. For instance, the filesystem monitor 150 may determine that a file named "report.txt" satisfies the conditional expression of the record definition, and accordingly may identify the file as a record. Of course, such an example is without limitation and is for illustrative purposes, and one of ordinary skill in the art will quickly recognize that any expression or technique for identifying records or patterns of records may be used instead. Furthermore, upon identifying a particular file 135 as a record, the filesystem monitor 150 may transmit an identifier of the file 135 to the record manager server for inclusion in a comprehensive listing of records. Such an identifier may include a name of the file 135, a location of the file, a time and date the file was created, and so on.

Once the records on the filesystem are identified, the filesystem monitor 150 may monitor file activity associated with the identified records. Upon detecting file activity, the filesystem monitor 150 may ensure that the record disposition protocol is enforced with regard to the file activity and the record involved in the file activity. Generally, the record disposition protocol specifies allowable and disallowable activities for the records. For instance, an exemplary record disposition protocol may specify that a first record may be viewed but may not be modified, while a second record may be viewed and modified but may not be deleted. The record disposition protocol may also specify what file activities should be logged and what information should be logged regarding the file activity. As an example, although the record disposition protocol may allow users to modify a particular record, the record disposition protocol may specify that all modifications should be logged. Of course, all the above examples are without limitation and for illustrative purposes only. More generally, it is broadly contemplated that any record disposition protocol consistent with the functions described herein may be used with embodiments of the invention.

Furthermore, if the filesystem monitor 150 enforcement of the record disposition protocol may include preventing the file activity. As an example, if the filesystem monitor 150 detects that a particular application 160 is attempting to delete one of the files 135 that the filesystem monitor 150 has identified as a record, if such a deletion would violate the record disposition protocol, the filesystem monitor 150 may prevent the application 160 from deleting the record. Additionally, in such a scenario, the filesystem monitor 150 may create a log entry specifying which application 160 attempted to delete the record, a user associated with the file activity, a time the activity occurred, and so on. In one embodiment, the filesystem monitor 150 may transmit such a log entry to the record manager server 180 for inclusion in a comprehensive listing of log entries.

Advantageously, embodiments of the invention enable the identification and management of records on the monitored system 120. That is, when an application 160 attempts to access a file 135 identified as a record, the filesystem monitor 150 may detect such an access and ensure that the access is permitted under the record disposition protocol. In the event that such an action is not permitted, the filesystem monitor 150 may intervene and prevent the action from occurring. Additionally, the filesystem monitor 150 may detect when an application 160 creates a new file 135 on the filesystem and may determine whether the newly created file should be marked as a record (e.g., using the record definitions 155). Of note, embodiments of the invention may perform these actions, even when the network connection to the record manager server 180 is lost. That is, because the filesystem monitor 150 and record definitions 155 are maintained locally on the monitor system 120, embodiments may enforce the record disposition protocol of a particular business or government office, even when a user is working offline. Information regarding newly-identified records and log entries may then be transmitted to the record manager server 180 once the network connection is re-established. Advantageously, by doing this, embodiments of the invention may enforce the record disposition protocol in a way that does not interview with modern business work habits.

Figure 2A:
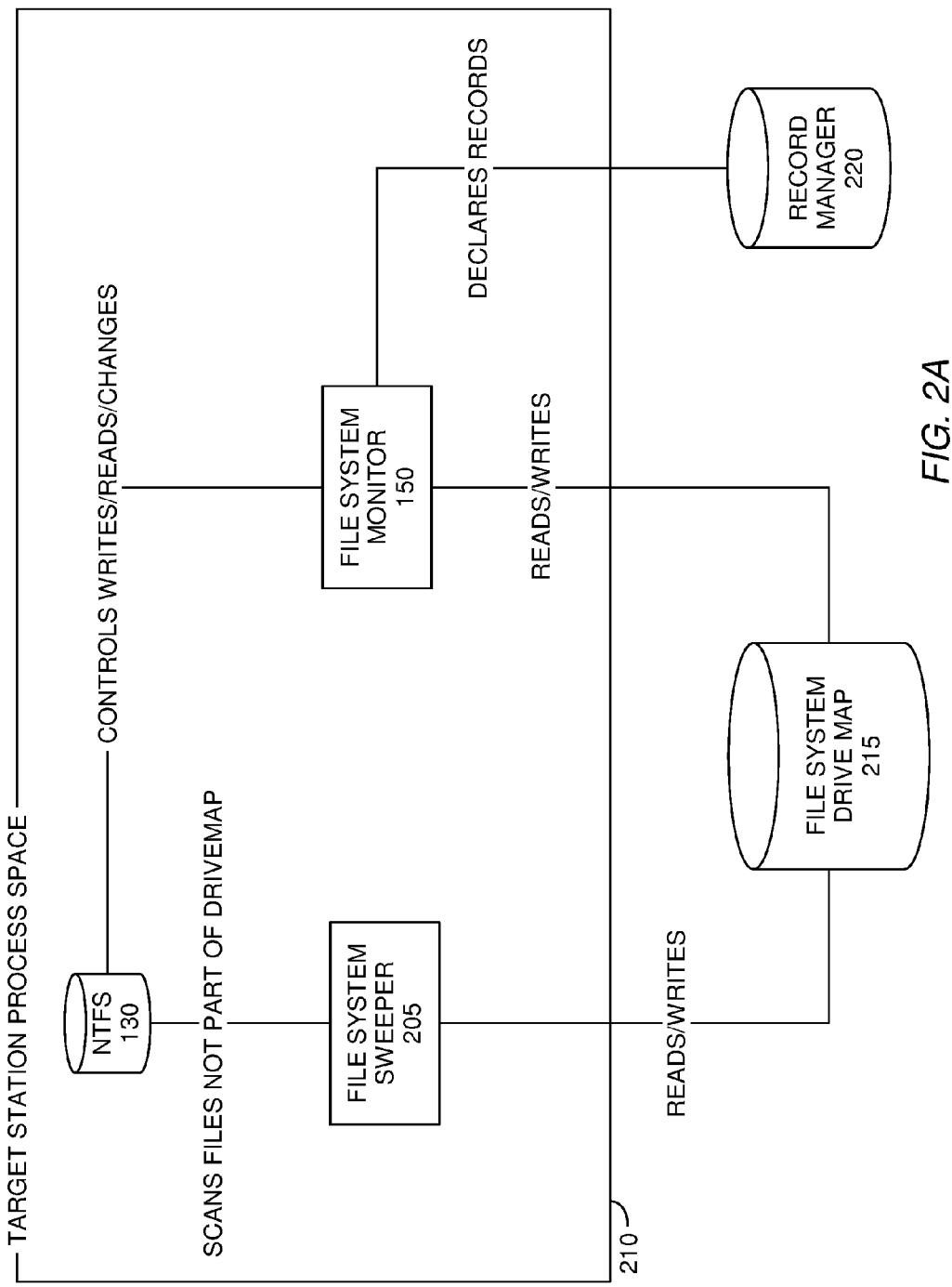
FIGS. 2A-2B are block diagrams illustrating systems configured to run filesystem monitors, according to embodiments of the present invention.
Figure 2B:
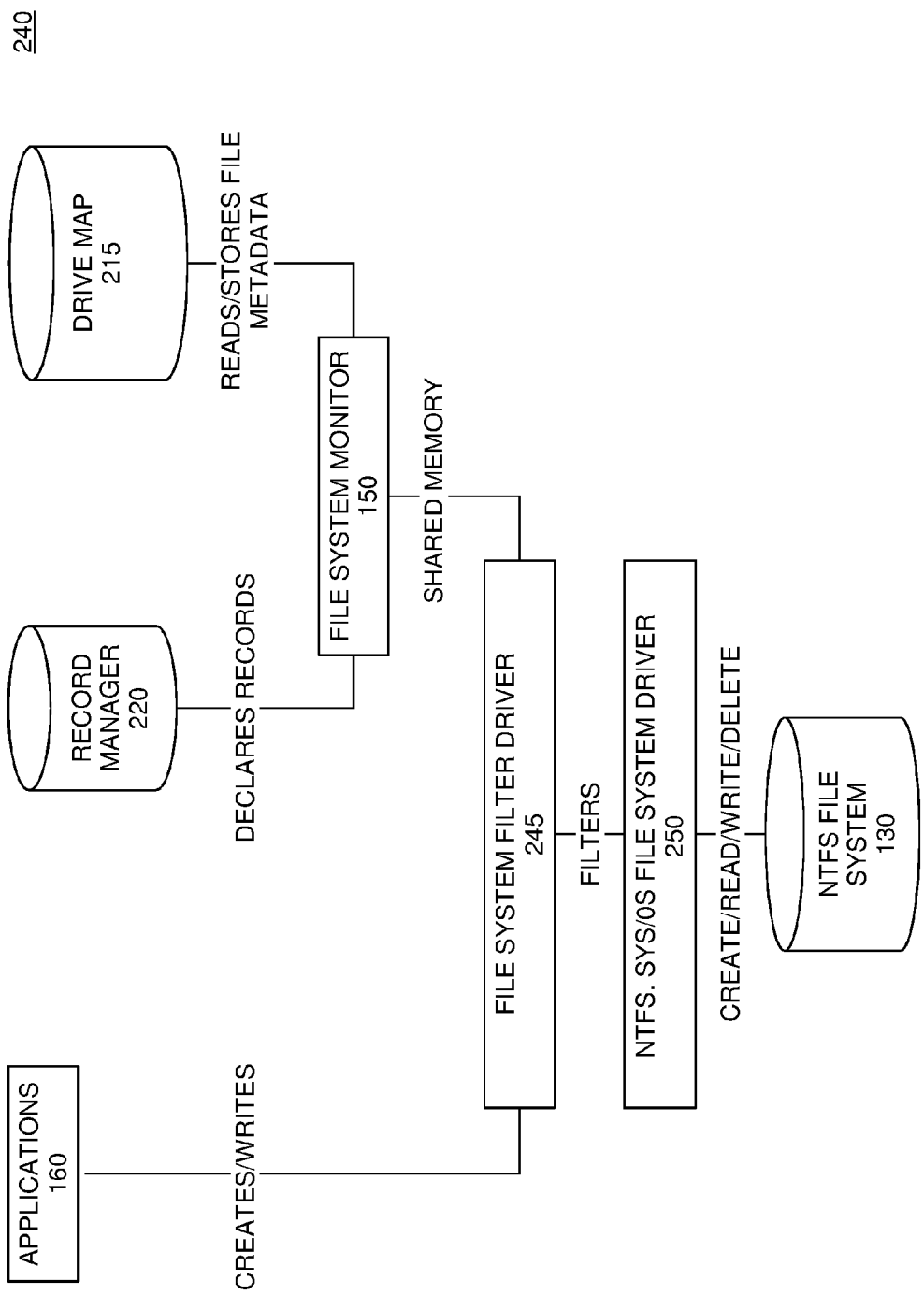

FIGS. 2A-2B are block diagrams illustrating systems configured to run filesystem monitors, according to embodiments of the present invention. FIG. 2A illustrates a system 200 configured to run a filesystem monitor 150, according to one embodiment of the present invention. The system 200 includes a filesystem 130 formatted in the NTFS filesystem format. Of note, although the depicted embodiment includes an NTFS filesystem format, it is broadly contemplated that embodiments of the invention may be adapted for use with any filesystem format consistent with the functions described herein. In the depicted embodiment, a filesystem sweeper 205 may access the filesystem 130 to scan for newly-created files that have not yet been identified as a record. In performing this task, the filesystem sweeper 205 may use one or more record definitions 155 for use in identifying potential records on the filesystem 130. The filesystem drive map 215 is generally a storage repository which may contain data such as one or more record definitions 155 and a listing of all records on the filesystem 130. Accordingly, the filesystem sweeper 205 may retrieve the record definitions 155 from the drive map 215 and may scan the files on the filesystem 130, using the retrieved record definitions 155 to determine whether particular files should be marked as records. Upon determining that a particular file should be declared a record, the filesystem sweeper 205 may update the listing of records contained in the drive map 215 to include the particular file.

The system 200 further contains a filesystem monitor 150 which enforces a record disposition protocol to control file activities to identified records on the filesystem 130. Such activities may include writes, reads and modifications to records. As discussed above, the drive map 215 may contain a listing of all records on the filesystem 130. The filesystem monitor 150 may retrieve the listing of records from the drive map 215 and may monitor any file activities relating to the listed records. If the filesystem monitor 150 determines that a particular file activity involving a record would violate the record disposition protocol, the filesystem monitor 150 may prevent the activity from occurring. As an example, if the filesystem monitor 150 determines that a particular user is attempting to delete a record, if such a deletion would violate the record disposition protocol, the filesystem monitor 150 may intervene and prevent the deletion operation from occurring.

The filesystem monitor 150 may further create log entries based on detected file activities. Continuing the above example, upon preventing the deletion operation for the record, the filesystem monitor 150 may generate a log entry which identifies that the deletion operation was prevented. The log entry may further contain information such as what time the deletion operation occurred, which application attempted to perform the operation, and which user attempted to perform the operation. The filesystem monitor 150 may also create log entries for file activities that the filesystem monitor 150 allowed to occur. For example, the record disposition protocol may specify that a particular record may be viewed by certain users, but that all accesses to the record should be logged. If one of the specified users then goes to view the file, the filesystem monitor 150 may allow the activity to occur, but may create a log entry describing the record that was viewed, who viewed the record, when the record was viewed, and so on. Of course, such examples are without limitation and are for illustrative purposes. More generally, it is broadly contemplated that any data relating to the record or the file activity may be logged.

The filesystem monitor 150 may also communicate with a record manager 220. Such communication may include retrieving an updated set of record definitions and storing the updated record definitions in the drive map 215. That is, although the filesystem monitor 150 on a business workstation may maintain a local set of record definitions so that records may be identified when the workstation is not connected to the record manager 220 (e.g., when a user is working offline), the record manager 220 may contain a global set of record definitions for the particular business. Thus, the filesystem monitor 150 may periodically update the local record definitions from the global set of record definitions maintained by the record manager 220. Furthermore, the filesystem monitor 150 may transmit the listing of records stored in the drive map 215 (i.e., a listing of files identified as records by the filesystem sweeper 205) to the record manager 220. That is, while embodiments of the invention may enforce the record disposition protocol locally on a business workstation, the business may still wish to maintain a centralize listing of all records on all the workstations owned by the business. Thus, upon receiving the list of records from the depicted workstation, the record manager 220 may include the received list of record in a comprehensive list of records spanning all the workstations of the business.

FIG. 2B illustrates a system 240 configured to run a filesystem monitor 150, according to one embodiment of the present invention. Of note, the system 240 depicts an embodiment of the invention using a filesystem filter driver 245 to monitor file activities relating to identified records. As shown, the system 240 includes a filesystem monitor 150 which may communicate with a record manager 220. As discussed above, the filesystem monitor 150 may retrieve an updated set of record definitions from the record manager 220 and may store the record definitions in the drive map 215. The drive map 215 may further contain a listing of all records on the filesystem being monitored. The filesystem monitor 150 may retrieve such a listing of records and may instruct the filesystem filter drive 245 to monitor any file activities relating to the listed records.

Generally, the filesystem filter driver 245 is a low-level system I/O component which operates adjacent to the NTFS.sys/operating system filesystem driver 250. The OS filesystem driver 250, in turn, is the lowest-level I/O component which is responsible for formatting data for create, read, write and delete operations on the NTFS file system 130. Advantageously, by using a filesystem filter driver 245 to monitor file activities relating to identified records, embodiments of the invention may enforce the file disposition protocol in a way that may not be easily circumvented by users of the system. That is, because the depicted embodiment uses a filesystem filter driver 245, a low-level system I/O component, such an embodiment may restrict the actions of even a system administrator. This is advantageous, for example, in showing compliance with a particular law or regulation. Put another way, if the record disposition protocol could be easily circumvented by a user with administrator access, it may be more difficult to prove that a particular user with administrator access did not violate the record disposition protocol. Accordingly, by implementing embodiments of the invention in a way that cannot be easily circumvented, even by system administrators, Upon the filesystem filter driver 245 detecting file activity by one of the applications 160 relating to an identified record, the file system monitor 150 may determine whether the file activity violates the record disposition protocol. Upon determining the activity would violate the protocol, the filesystem monitor 150 may instruct the filesystem filter driver 245 to prevent the file activity from occurring. As discussed above, the filesystem monitor 150 may further create a log entry upon detecting the file activity. If the filesystem monitor 150 determines the activity would not violate the record disposition protocol, the filesystem filter driver 245 may allow the activity to occur. Of note, even in this situation, the filesystem filter driver 245 may monitor what actions are performed on the record. The filesystem monitor 150 may then create a log entry describing the actions performed. For instance, if an application 160 performs a modification on a particular record, the filesystem monitor 150 may generate a log entry containing a listing of all changes made to the record. Advantageously, by doing this, a business may later review the history of a particular record and determine who modified the record, when the record was modified, what content with the record was modified, and so on.

Figure 3:
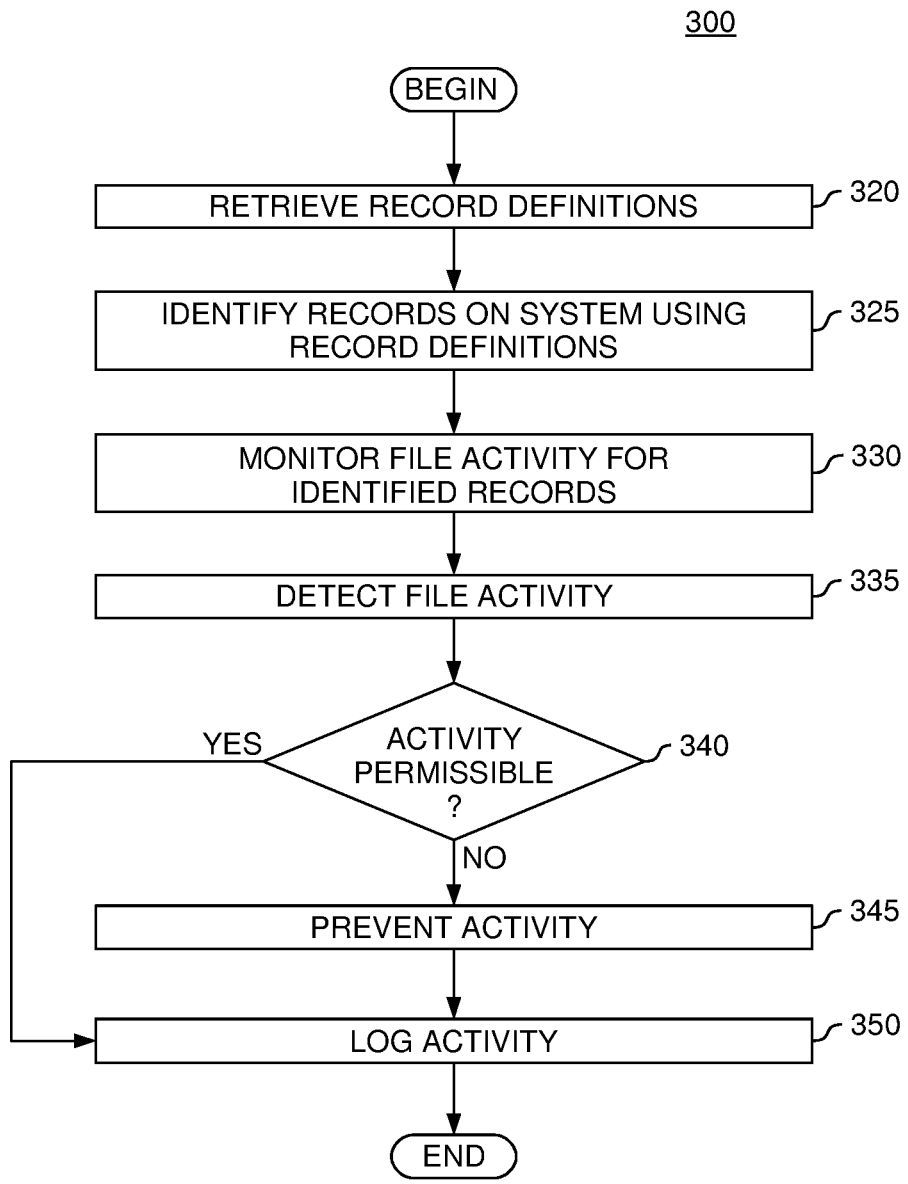
FIG. 3 is a flow chart illustrating a method for managing records on a filesystem, according to one embodiment of the present invention.

FIG. 3 is a flow chart illustrating a method for managing records on a filesystem, according to one embodiment of the present invention. As shown, the method 300 begins at step 320, where the filesystem monitor 150 retrieves a set of record definitions. The record definitions may be retrieved from a local storage location (e.g., record definitions 155 on the monitored system 120) when a user is working offline and no connection to a record manager is available. Alternatively, the record definitions may be retrieved remotely from a record manager (e.g., on the record manager server 180) when a network connection to the record manager is available.

Upon retrieving the record definitions, the filesystem monitor 150 may use the record definitions to identify records on the filesystem (step 325). As discussed above, each record definition may include a conditional expression which may be used to identify files. For instance, a record definition may include the expression "*Report*.doc," and the filesystem monitor 150 may determine that any file on the filesystem that matches the expression should be marked as a record. Once all the records on the filesystem are identified, the filesystem monitor 150 monitors file activity for each of the identified records (step 330). As discussed above, in one embodiment of the invention, the filesystem monitor 150 may communicate with a filesystem filter driver 245 to perform such monitoring.

At step 335, the filesystem monitor 150 detects file activity relating to one of the identified records. The filesystem monitor 150 then determines whether the detected activity is permissible under the record disposition protocol (step 340). As discussed above, the record disposition protocol generally specifies what types of file activity are allowed for particular records. As an example, the record disposition protocol may specify that a particular class of record may be viewed and modified, but may not be deleted. Under such a record disposition protocol, if the filesystem monitor 150 detects that the file activity is attempting to delete a record from the particular class, the filesystem monitor 150 may determine the activity is impermissible and may prevent the file activity from occurring (step 345). In one embodiment, the filesystem monitor 150 may further generate and display a notification to the user, stating that the file activity was not completed and providing an explanation as to why the activity was prevented.

Once the impermissible file activity is prevented, or if instead the filesystem monitor 150 determines the file activity is permissible, the filesystem monitor 150 creates a log entry for the detected activity (step 350), and the method 300 ends. As discussed above, such a log entry may include information such as when the file activity occurred, the record that was the subject of the file activity, a user associated with the file activity and an application which performed or attempted to perform the file activity. Additionally, in the event that the file activity is a modification to a particular record, the filesystem monitor 150 may note in the log entry that the content of the record was modified. Such a log entry may further include information in the log entry specifying what content in the record was modified. By including the modified content in the log entry, a business may review all the log entries for a particular record at a later point in time and determine all the content changes to the document, when the changes occurred, which user made the changes, and so on.

Additionally, the log entry may be created even when the file activity was deemed permissible and even when the file activity does not involve a modification to the record. For example, the filesystem monitor 150 may be configured to generate a log entry each time a user views a particular record. In this scenario, the log entry may include information identifying the record, which user viewed the record, and when the user viewed the record. Such logging activity may enable embodiments of the invention to be used to show compliance with a particular law or regulation. For instance, if a business needs to prove that a particular employee did not have knowledge of the contents of a particular record (e.g., in defending a charge of insider trading), the business may review the log entries generated for the record and, if the log entries show that the particular employee never viewed the record in question, may show that the employee did not have knowledge of the record's contents.

Advantageously, the method 300 may be performed even when the computer system being monitored is not connected to a centralized record manager server. For example, if a user is working offline using a laptop (e.g., while the user is travelling), the method 300 may still be used to identify documents created offline by the user as records and enforce the record disposition protocol for the identified records. Upon re-establishing a connection to the record manager server, the filesystem monitor 150 may transmit an updating listing of identified records on the local filesystem to the record manager server. The filesystem monitor 150 may also transmit any log entries that were generated offline to the record manager server. By doing this, the record manager server may still maintain consolidated lists of all records and all file activities involving the records for all the computer systems of a business. Furthermore, by enabling the record disposition protocol to be enforced even when the various workstations are working offline, the method 300 ensures proper treatment of the identified records, while giving users more flexibility in using their computer system and not requiring a network connection to the centralized record manager server.

Figure 4:
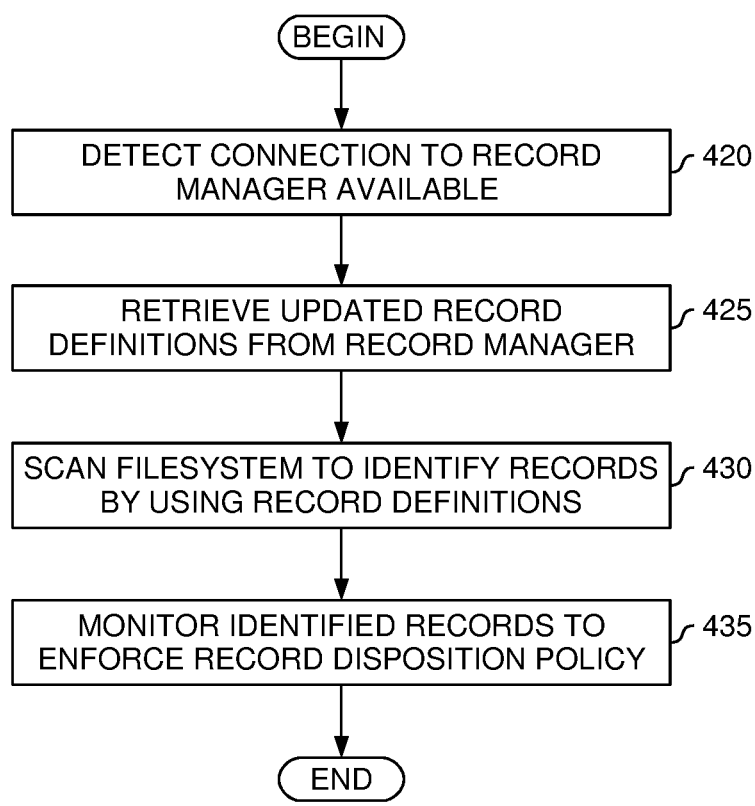
FIG. 4 is a flow chart illustrating a method for updating record definitions for a filesystem monitor, according to one embodiment of the present invention.

FIG. 4 is a flow chart illustrating a method for updating record definitions for a filesystem monitor, according to one embodiment of the present invention. As shown, the method 400 begins at step 420, where the filesystem monitor 150 detects a network connection to the record manager is available. In one embodiment, the filesystem monitor 150 is configured to periodically determine whether such a connection is available. In another embodiment, the filesystem monitor 150 may check for a connection to the record manager server upon detecting a change in the connection status. For example, upon detecting that a user's workstation has joined a new wireless network, the filesystem monitor 150 may determine whether a connection to the record manager is available.

Upon detecting that the connection is available, the filesystem monitor 150 retrieves an updated set of record definitions from the record manager (step 425). That is, although the filesystem monitor 150 maintains a local set of record definitions for use in identifying records on the local system, such a local set of record definitions may periodically be updated from a global set of record definitions maintained on a central record manager. Upon retrieving the updated set of record definitions, the filesystem monitor 150 performs a scan of the filesystem to identify any records contained on the filesystem (step 430). As discussed above, in one embodiment of the invention, a filesystem sweeper 205 may be used to perform such a task.

Furthermore, in one embodiment, the filesystem sweeper 205 may be configured to perform such a scan continuously as a background process on the computer system. In such an embodiment, the filesystem sweeper 205 scans for files that were created before the filesystem monitor 150 was active on the computer system. By doing this, embodiments may not only detect existing records on the filesystem, but may also identify newly-created files as records. For example, assume a record definition on the system contains the conditional expression "*.doc." If a user previously created a document named "YearlyReport.doc" using a word processing application, the filesystem sweeper 205 may determine this document satisfies the conditional expression contained in the record definition, and may mark the document as a record. As a second example, if, once the filesystem monitor 150 is active, the user creates a document named "YearlyBudget.doc" using the word processing application, the filesystem monitor 150 may detect that the newly-created document satisfies the conditional expression contained in the record definition and thus mark the newly-created document as a record. Advantageously, by doing this, embodiments may enforce the record disposition protocol both for documents created before the monitoring solution was active and documents created subsequent to the activation of the monitoring solution. This is the case even when the document is created offline (i.e., without a network connection to the record manager).

Once the filesystem is scanned and all the records are identified, the filesystem monitor 150 monitors the identified records to enforce the record disposition protocol (step 435), and the method 400 ends. As discussed above, such enforcement may include preventing actions that the filesystem monitor 150 determines are impermissible. Additionally, the enforcement may include creating log entries for each detected file activity involving one or more records. Advantageously, by creating such log entries, embodiments of the invention enable users to review all the actions (e.g., reads, writes, deletions, etc.) performed or attempted to be performed on records on the computer system. Such log entries may be particularly useful, for example, in showing that a particular user had knowledge (or lack thereof) of the contents of a particular document marked as a record. As a second example, such log entries may further be used to show when a particular record was modified, who modified the record and even what content within the record was modified.

Figure 5:
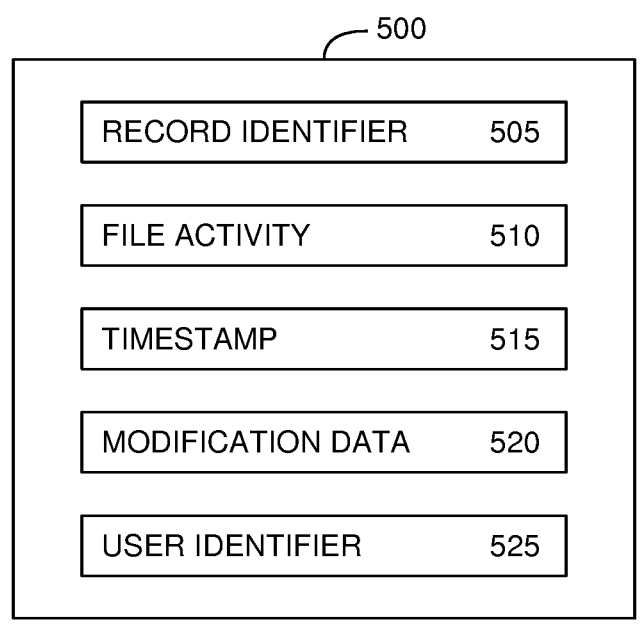
FIG. 5 is a block diagram illustrating a log entry for logging filesystem activity, according to one embodiment of the present invention.

FIG. 5 is a block diagram illustrating a log entry for logging filesystem activity, according to one embodiment of the present invention. As shown, the log entry 500 contains a record identifier 505, a file activity 510, a timestamp 515, record modification data 520 and a user identifier 525. The record identifier 505 generally includes data that may be used to identify a particular record on the filesystem. In one embodiment, the record identifier 505 contains a filesystem path and a filename identifying the record. The file activity 510 generally specifies what filesystem activity was detected. For example, if the log entry 500 was generated when the filesystem monitor 150 detected a user attempting to delete a record on the filesystem, the file activity 510 may include the string "RECORD DELETION." As a second example, if the log entry 500 was generated when the filesystem monitor 150 detected a user attempting to modify the content of a record, the file activity 510 may include the string "RECORD MODIFICATON." Of course, such an example is without limitation and for illustrative purposes only, and one of ordinary skill in the art will recognize that numerous other techniques for identifying an activity on a filesystem may be used instead.

The timestamp 515 provides an indication of the time when the filesystem activity occurred. Additionally, the modification data 520 contains data identifying what, if any, changes were made to the record as part of the detected filesystem activity. For example, if the record is a particular document which the user added two new paragraphs two as part of the detected activity, the modification data 520 may include the content of the two new paragraphs and may further include information specifying where the two paragraphs were inserted into the record. The user identifier 525 provides information which may be used to determine which user performed the filesystem activity.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A record management system, comprising:
 a computer processor; and
 a memory containing a program that, when executed by the computer processor, performs an operation for managing records, comprising:
  retrieving a record definition specifying one or more conditional expressions for use in identifying files to be classified as electronic records to be retained;
  for each of a plurality of files from a plurality of filesystems, where the respective file satisfies the one or more conditional expressions in the record definition, classifying the respective file as an electronic record;
  monitoring activity in each of the plurality of filesystems by a respective filesystem monitor of a plurality of filesystem monitors; and
  for the monitored activity and by at least one of the filesystem monitors, preventing at least one of access, alteration and deletion of the files classified as electronic records, based on a record disposition protocol associated with the record definition, wherein the preventing comprises:
   upon determining the monitored activity violates the record disposition protocol, preventing the monitored activity from occurring; and
   upon determining the monitored activity does not violate the record disposition protocol:
    allowing the monitored activity to complete; and
    creating a log entry describing the monitor activity;
  retrieving at least one update for the record definition from a record manager; and
  applying the at least one retrieved update to the record definition, such that when the at least one retrieved update is applied, the record definition is the same as a corresponding record definition maintained by the record manager.

2. The system of claim 1, wherein the created log entry describes at least one of (i) an instance of monitored activity, (ii) an electronic record associated with instance of the monitored activity, (iii) an indicator of a time when the instance of monitored activity occurred, (iv) a user identifier which identifies a user performing the instance of monitored activity, and (v) any modifications made to one of the electronic records as part of the monitored activity.

3. The system of claim 1, the operation further comprising:
 transmitting the created log entry to a record manager for addition to a comprehensive store of log entries across the plurality of filesystems.

4. The system of claim 1, the operation further comprising:
 transmitting a listing of the declared electronic records to the record manager for inclusion in a comprehensive listing of electronic records across the plurality of filesystems.

5. A computer program product for managing records, comprising:
 a computer-readable storage memory having computer readable program code embodied therewith, the computer readable program code comprising:
  computer readable program code to retrieve a record definition specifying one or more conditional expressions for use in identifying files to be classified as electronic records to be retained;
  computer readable program code to, for each of a plurality of files from a plurality of filesystems, where the respective file satisfies the one or more conditional expressions in the record definition, classifying the respective file as an electronic record;
  computer readable program code to monitor activity in each of the plurality of filesystems by a respective filesystem monitor of a plurality of filesystem monitors;
  computer readable program code to, for the monitored activity and by at least one of the filesystem monitors, prevent at least one of access, alteration and deletion of the files classified as electronic records, based on a record disposition protocol associated with the record definition, wherein the computer readable program code to prevent at least one of access, alteration and deletion for the files classified as electronic records, further comprises:
   computer readable program code to, upon determining the monitored activity violates the record disposition protocol, prevent the monitored activity from occurring; and
   computer readable program code to, upon determining the monitored activity does not violate the record disposition protocol:
    allow the monitored activity to complete; and
    create a log entry describing the monitor activity;
  computer readable program code to retrieve one or more updates for the record definition from a record manager; and
  computer readable program code to apply the retrieved one or more updates to the record definition, such that when the one or more updates are applied the record definition is the same as a corresponding record definition maintained by the record manager.

6. The computer program product of claim 5, wherein the created log entry describes at least one of (i) an instance of monitored activity, (ii) an electronic record associated with instance of the monitored activity, (iii) an indicator of a time when the instance of monitored activity occurred, (iv) a user identifier which identifies a user performing the instance of monitored activity, and (v) any modifications made to one of the electronic records as part of the monitored activity.

7. The computer program product of claim 6, further comprising:

computer readable program code to transmit the created log entry to a record manager for addition to a comprehensive store of log entries across the plurality of filesystems.

8. The computer program product of claim 5, further comprising:

computer readable program code to transmit a listing of the declared electronic records to the record manager for inclusion in a comprehensive listing of electronic records across the plurality of filesystems.

* * * * *